US011939183B2

(12) United States Patent
Kishimoto et al.

(10) Patent No.: US 11,939,183 B2
(45) Date of Patent: Mar. 26, 2024

(54) POST-PROCESSING APPARATUS

(71) Applicant: KYOCERA Document Solutions Inc., Osaka (JP)

(72) Inventors: Tadahisa Kishimoto, Osaka (JP); Yoshiaki Tashiro, Osaka (JP); Koji Murata, Osaka (JP); Masahiko Miyazaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/000,209

(22) PCT Filed: May 19, 2021

(86) PCT No.: PCT/JP2021/018913
§ 371 (c)(1),
(2) Date: Nov. 29, 2022

(87) PCT Pub. No.: WO2021/246168
PCT Pub. Date: Dec. 9, 2021

(65) Prior Publication Data

US 2023/0202793 A1 Jun. 29, 2023

(30) Foreign Application Priority Data

Jun. 3, 2020 (JP) ................................ 2020-097060

(51) Int. Cl.
*B65H 45/20* (2006.01)
*B42B 4/00* (2006.01)
(Continued)

(52) U.S. Cl.
CPC ............... *B65H 45/18* (2013.01); *B42B 4/00* (2013.01); *B65H 43/00* (2013.01); *B65H 2301/452* (2013.01)

(58) Field of Classification Search
CPC .......... B42B 4/00; B65H 37/06; B65H 43/08; B65H 45/18; B65H 45/20; B65H 2301/452
(Continued)

(56) References Cited

U.S. PATENT DOCUMENTS 5,092,833 A * 3/1992 King ...................... B65H 45/18 493/431
5,242,364 A * 9/1993 Lehmann ............... B65H 5/025 493/15
(Continued)

FOREIGN PATENT DOCUMENTS

JP 2011-093688 A 5/2011
JP 2015-199594 A 11/2015
JP 2017-132572 A 8/2017

*Primary Examiner* — Leslie A Nicholson, III
(74) *Attorney, Agent, or Firm* — Studebaker & Brackett PC

(57) ABSTRACT

A post-processing apparatus (1) includes a first conveyance path (41), a first processing part (55), a second conveyance path (95) and a merging conveyance path (97), and the first processing part (55) includes a conveying rollers pair (80) including a first roller (81) and a second roller (83) conveying the sheet along a first direction; a first folding rollers pair (84) including the first roller (81) and a third roller (85) forming a first nip, conveying the sheet along a second direction and performing a folding processing along a first fold line; a second folding rollers pair (86) including the third roller (85) and a fourth roller (87) forming a second nip, conveying the sheet along a third direction and performing a folding processing along a second fold line; a first folding guide (89) movable to the first nip; and a second folding guide (91) movable to the second nip.

7 Claims, 10 Drawing Sheets

(51) Int. Cl.
*B65H 43/00* (2006.01)
*B65H 45/18* (2006.01)

(58) Field of Classification Search
USPC ..... 270/32, 37; 493/416, 442, 443, 444, 445
See application file for complete search history.

(56) References Cited

U.S. PATENT DOCUMENTS

| | | | | |
|---|---|---|---|---|
| 7,040,612 | B2 * | 5/2006 | Garner | B65H 45/18<br>270/8 |
| 8,342,497 | B2 * | 1/2013 | Abe | B42B 4/00<br>270/58.08 |
| 8,590,880 | B2 * | 11/2013 | Imazu | G03G 15/6582<br>399/407 |
| 9,108,821 | B2 * | 8/2015 | Nakada | B65H 45/12 |
| 9,533,853 | B2 * | 1/2017 | Nakagawa | B65H 45/14 |
| 9,555,998 | B2 * | 1/2017 | Watanabe | B65H 9/006 |
| 9,637,342 | B2 * | 5/2017 | Hari | B65H 45/30 |
| 9,643,813 | B2 * | 5/2017 | Kugimiya | B65H 45/18 |
| 10,105,968 | B2 * | 10/2018 | Iwata | B65H 45/16 |
| 11,485,601 | B2 * | 11/2022 | Egawa | B65H 31/26 |
| 11,560,286 | B2 * | 1/2023 | Murata | B65H 29/58 |
| 2011/0103866 | A1 | 5/2011 | Mazu et al. | |

* cited by examiner

POST-PROCESSING APPARATUS

TECHNICAL FIELD

The present invention relates to a post-processing apparatus including a folding device which folds a sheet.

BACKGROUND

A post-processing apparatus disclosed in Patent document 1 includes a central roller, a first roller for forming a first nip with the central roller, and a second roller for forming a second nip with the central roller, and folds a sheet in a Z-fold. The central roller and the first roller fold the sheet at the first nip and then convey it to the first conveyance path, and the central roller and the second roller fold the sheet at the second nip and then convey it to the second conveyance path.

PRIOR ART DOCUMENTS

Patent Documents

[Patent Document 1] Japanese Unexamined Patent Application Publication No. 2017 132572

SUMMARY OF THE INVENTION

Problems to be Solved by the Invention

In the post-processing apparatus described in the above patent document 1, the central roller is rotated in one direction and in the other direction to selectively convey the sheet to the first conveyance path and the second conveyance path. When the central roller is inverted in this manner, there is a problem that the productivity of the folding process becomes low. Also, since the folding method contains only the Z-folding, there is a problem that it cannot cope with various folding methods.

In view of the above, it is an object of the present invention to provide a post-processing apparatus which performs various post-processing including folding processing for folding a sheet by various folding methods.

Means of Solving the Problems

In order to achieve the above object, a post-processing apparatus of the present invention includes a first sheet conveyance path along which a sheet is conveyed in a first direction from a sheet carry-in port to a first sheet discharge port; a first processing part which performs a folding processing in which the sheet conveyed along the first conveyance path is fold along a fold line parallel with a width direction perpendicular to the first direction; a second sheet conveyance path along which the sheet is conveyed from the first processing part along a second direction crossing the first direction; and a merging conveyance path along which the sheet is conveyed from the first processing part in a third direction crossing the second direction and which merges with the first sheet conveyance path, wherein the first processing part includes: a conveying rollers pair including a first roller and a second roller which form a conveying nip and conveying the sheet in the first direction; first folding rollers pair including the first roller and a third roller which form a first nip, conveying the sheet along the second direction and performing a folding processing in which the sheet is fold along a first fold line; a second folding rollers pair including the third roller and a fourth roller which form a second nip, conveying the sheet along the third direction and performing a folding processing in which the sheet is fold along a second fold line different from the first fold line; a first folding guide configured to be movable between a projecting position close to the first nip and a retracting position away from the first nip; and a second folding guide configured to be movable between a projecting position close to the second nip and a retracting position away from the second nip, wherein when the sheet is conveyed along the first direction, the first folding guide is disposed at the retracting position, when the sheet is conveyed from the first conveyance path to the second conveyance path, the first folding guide is moved from the retracting position to the projecting position to guide a leading end of the sheet to the first nip, and when the folding processing in which the sheet is fold along the first fold line by the first folding rollers pair is performed, after the leading end of the sheet is passed through the first folding guide, the first folding guide is moved from the retracting position to the projecting position so as to come into contact with the first fold line of the sheet and to guide the sheet to the first nip with the first fold line forward.

Effects of the Invention

According to the present invention, it becomes possible to convey a sheet to a predetermined post-processing part and to perform a folding processing of the sheet smoothly.

EMBODIMENT FOR CARRYING OUT THE INVENTION

Hereinafter, with reference to the attached drawings, a post-processing apparatus according to one embodiment of the present invention will be described.

Figure 1:
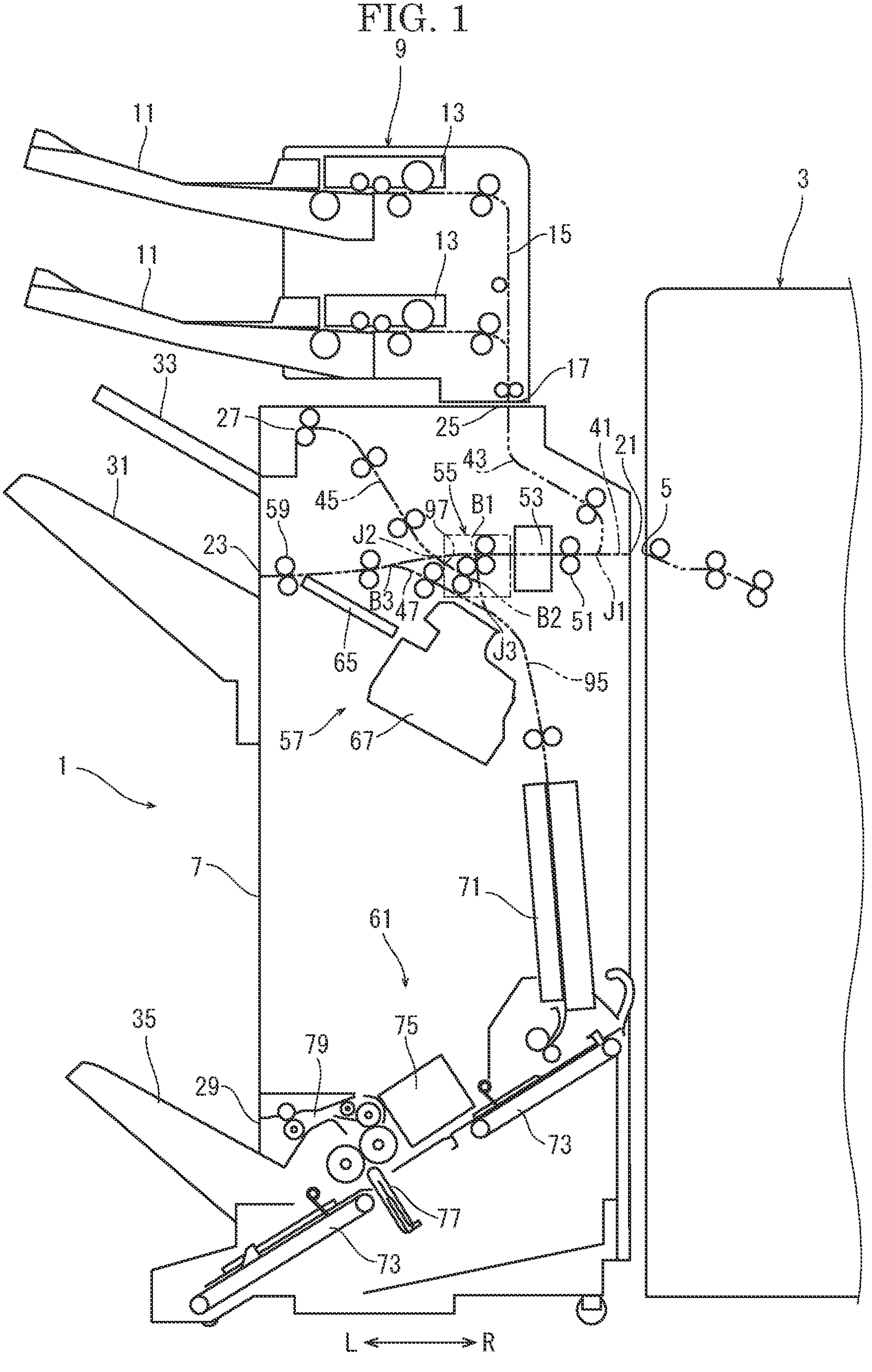
FIG. 1 is a front view schematically showing a post-processing apparatus according to one embodiment of the present invention.
Figure 2:
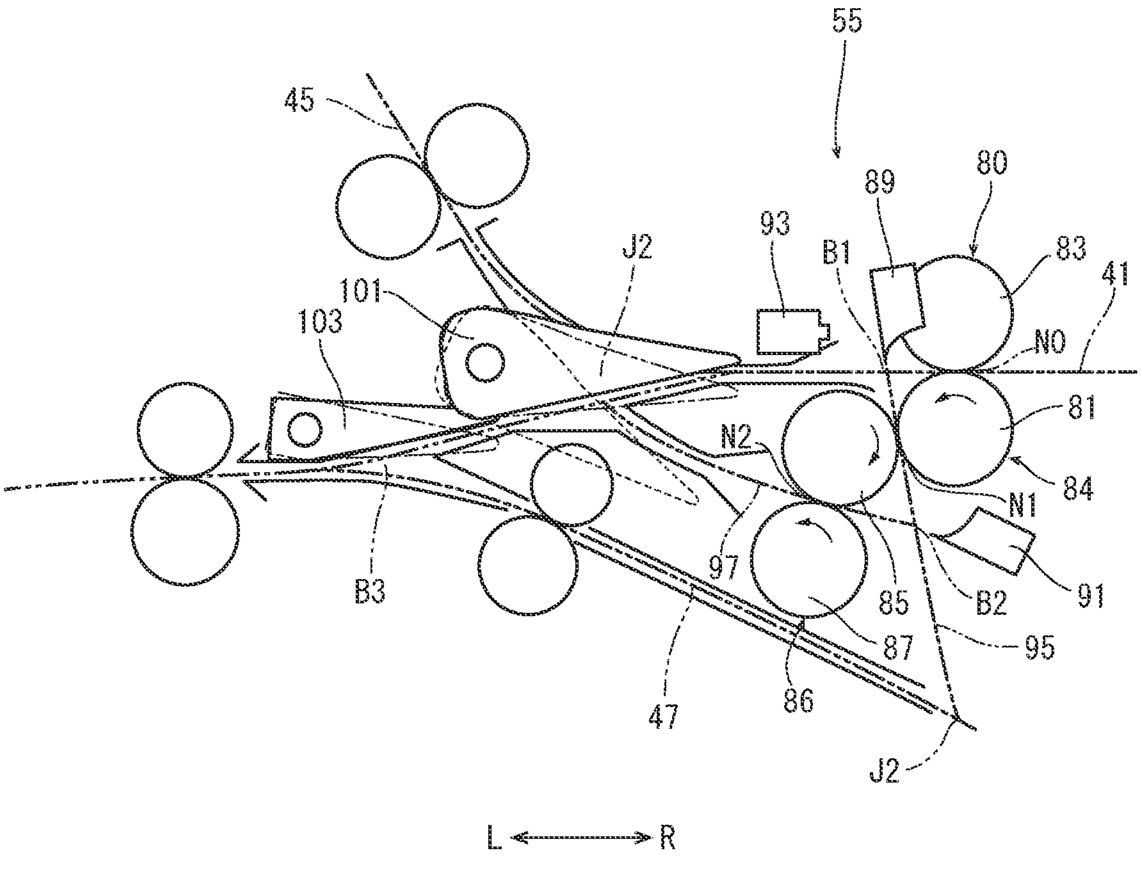
FIG. 2 is a front view schematically showing a folding device according to the embodiment of the present invention.

With reference to FIG. 1 and FIG. 2, the post-processing apparatus 1 will be described. FIG. 1 is a front view schematically showing the post-processing apparatus 1, an image forming apparatus 3, and an inserter 9. FIG. 2 is a front view schematically showing a folding device 55. The front side of the paper plane on which FIG. 1 is drawn is defined as the front side of the post-processing apparatus 1. Reference numerals L and R in each drawing indicate the left and right sides of the post-processing apparatus 1, respectively.

The post-processing apparatus 1 is disposed adjacent to the electrophotographic or ink-jet image forming apparatus 3 in the left-and-right direction. The image forming apparatus 3 has a sheet discharge port 5 on the upper portion of the side surface (the left side surface) on the side of the post-processing apparatus 1.

The inserter 9 is mounted on the post-processing apparatus 1. The inserter 9 includes an upper and lower manual sheet feeding trays 11, a sheet feeding mechanism 13 which feeds a sheet from each manual sheet feeding tray 11, and conveyance paths 15 along which the sheet fed by each sheet feeding mechanism 13 is conveyed. The conveyance paths 15 are formed along the upper-and-lower direction, and is connected to a sheet discharge port 17 formed on the bottom surface of the inserter 9.

Next, the configuration of the post-processing apparatus 1 will be described. The post-processing apparatus 1 performs post-processing (punching processing, folding processing, stapling processing, and bookbinding processing) to the sheet (or a bundle of the sheet) on which an image is formed by the image forming apparatus 3, or to a sheet bundle in which a cover sheet or the like fed by the inserter 9 is inserted into the sheets on which an image is formed by the image forming apparatus 3.

The main body 7 of the post-processing apparatus 1 has a sheet carry-in port 21 on the upper portion of the side surface (the right side surface) on the side of the image forming apparatus 3, and a first sheet discharge port 23 on the upper portion of the other side surface (the left side surface) on the side opposite to the image forming apparatus 3. The sheet carry-in port 21 can receive the sheets from the sheet discharge port 5 of the image forming apparatus 3. Further, on the upper surface of the main body 7, an upper carry-in port 25 is formed at the end portion near the sheet carry-in port 21. The upper carry-in port 25 can receive the sheets from the sheet discharge port 17 of the inserter 9.

On the left side surface of the main body 7, a second sheet discharge port 27 is formed above the first sheet discharge port 23, and a third sheet discharge port 29 is formed below the first sheet discharge port 23. On the left side surface, a first sheet discharge tray 31, a second sheet discharge tray 33, and a third sheet discharge tray 35 are provided below the first to third sheet discharge ports 23, 27 and 29, respectively. The sheets to which the above-described post-processing is not performed are discharged through the second sheet discharge port 27 and then stacked on the second sheet discharge tray 33.

Inside the main body 7, a first sheet conveyance path 41 along which the sheet is conveyed along an approximately horizontal first conveying direction from the sheet carry-in port 21 to the first sheet discharge port 23 is provided. With the first sheet conveyance path 41, a sheet feeding path 43 extending from the upper carry-in port 25 is merged at a first merging portion J1 on the downstream side of the sheet carry-in port 21 in the first conveying direction. The first sheet conveyance path 41 is branched to a second sheet conveyance path 95 along which the sheet is conveyed along a downward second conveying direction, at a first branching portion B1 on the downstream side of the first merging portion J1 in the first conveying direction. The second sheet conveyance path 95 is branched to a merging conveyance path 97 at a second branching portion B2. The merging conveyance path 97 is merged with the first sheet conveyance path 41 at a second merging portion J2 on the downstream of the first branching portion B1 in the first conveying direction. The sheet is conveyed along the merging conveyance path 97 along a third direction from the second branching portion B2 toward the second merging portion J2.

The first sheet conveyance path 41 is branched to a third sheet conveyance path 45 along which the sheet is conveyed along a fourth direction toward the second sheet discharge port 27, at the second merging portion J2. Further, the first sheet conveyance path 41 is branched to an escape path 47 along which the sheet is conveyed along a fifth downward direction, at a third branching portion B3 on the downstream of the second merging portion J2 in the first conveying direction. The escape path 47 is merged with the second sheet conveyance path 95 at a third merging portion J3 on the downstream of the second branching portion B2 in the second conveying direction. In the following description, the upstream side and the downstream side indicate the upstream side and the downstream side in the first to fifth conveying directions.

Further, inside the main body 7, a carry-in rollers pair 51, a punching device 53, a folding device 55 as a first processing part, a stapling unit 57 as a second processing part, and a discharge rollers pair 59 are provided in order from the upstream side along the first sheet conveyance path 41. The carry-in rollers pair 51 is disposed inside the sheet carry-in port 21, and the discharge rollers pair 59 is disposed inside the first sheet discharge port. Further, a bookbinding unit 61 as a third processing part is provided on the downstream side of the second sheet conveyance path 95.

The punching device 53 is disposed on the downstream side of the carry-in rollers pair 51, and performs the punching processing to the sheet. The folding device 55 is disposed on the downstream side of the punching device 53, and performs the folding processing (Z-folding, outward three-folding, inward three-holding, two-folding, four-folding) to the sheet. The folding device 55 will be described later.

The stapling unit 57 is disposed on the downstream side of the folding device 55, and performs the stapling processing to the sheet bundle. The stapling unit 57 includes a first processing tray 65 and a stapler 67. The first processing tray 65 is disposed in a posture inclined downward from the discharge rollers pair 59 with respect to the first sheet conveyance path 41, and aligns the sheets to form the sheet bundle. The stapler 67 is disposed at the lower end portion of the first processing tray 65 to bind the end portion of the sheet bundle.

The bookbinding unit 61 includes a carry-in path 71 connected to the second sheet conveyance path 95 along the upper-and-lower direction, a second processing tray 73 provided below the carry-in path 71, a saddle stitching device 75 and a center-folding device 77 supported by the second processing tray 73, and a discharge part 79 provided between the center-folding device 77 and the third sheet discharge port 29.

Next, the folding device 55 will be described with reference to FIG. 2.

The folding device 55 includes a conveying rollers pair 80, a first folding rollers pair 84, a second folding rollers pair 86, a first folding guide 89, a second folding guide 91 and a sheet sensor 93. The conveying rollers pair 80 is disposed on the upstream side of the first branching portion B1 on the first sheet conveyance path 41, and conveys the sheet along the first sheet conveyance path 41. The first folding rollers pair 84 is disposed on the second sheet conveyance path 95, conveys the sheet along the second sheet conveyance path 95 and performs the folding processing to the sheet. The second folding rollers pair 86 is disposed on the merging conveyance path 97, conveys the sheet along the merging conveyance path 97, and performs the folding processing to the sheet. The first folding guide 89 is disposed at the first branching portion B1. The second folding guide 91 is disposed at the second branching portion B2. The sheet sensor 93 is disposed on the first sheet conveyance path 41. It can be said that the second sheet conveyance path 95 is provided so that the sheet is conveyed along the second conveying direction from the folding device 55. It can also be said that the merging conveyance path 97 is provided so that the sheet is conveyed along the third direction from the folding device 55.

The conveying rollers pair 80 includes a first roller 81 and a second roller 83. The first roller 81 is disposed below the first sheet conveyance path 41 and on the right side of the second sheet conveyance path 95, and the second roller 83 is disposed above the first sheet conveyance path 41. Both the rollers 81 and 83 are brought into contact with each other to form a conveying nip N0 on the first sheet conveyance path 41 between the rollers 81 and 83. The first roller 81 is driven by a motor (not shown) to be rotated in a predetermined rotational direction (counterclockwise direction in FIG. 2). The second roller 83 is driven by the first roller 81 to be rotated in a direction opposite to the first roller 81 (clockwise direction in FIG. 2). By the rotation of both the rollers 81 and 83, the sheet conveyed to the conveying nip N0 is conveyed to the downstream side.

The first folding rollers pair 84 includes the first roller 81 and a third roller 85. The third roller is disposed on the left side of the second sheet conveyance path 95 and above the merging conveyance path 97. Both the rollers 81 and 85 are brought into contact with each other to form a first nip N1 on the second sheet conveyance path 95 between the rollers 81 and 85. The third roller 85 is connected to the first roller 81 through a gear train. The third roller 85 is rotated in a forward direction (clockwise direction in FIG. 2) with respect to the rotational direction of the first roller 81. By the rotation of both the rollers 81 and 85, the sheet conveyed to the first nip N1 is conveyed to the downstream side along the second sheet conveyance path 95, or the folding processing is performed to the sheet.

The second folding rollers pair 86 includes the third roller 85 and a fourth roller 87. The fourth roller 87 is disposed below the merging conveyance path 97. Both the rollers 85 and 87 are brought into contact with each other to form a second nip N2 on the merging conveyance path 97. The fourth roller 87 is connected to the third roller 85 through a gear train. The fourth roller 87 is rotated in a forward direction (counterclockwise direction in FIG. 2) with respect to the rotational direction of the third roller 85. By the rotation of both the rollers 85 and 87, the sheet conveyed to the second nip N2 is conveyed to the downstream side along the merging conveyance path 97, or the folding processing is performed on the sheet.

The first folding guide 89 is disposed on the opposite side to the first nip N1 with respect to the first sheet conveyance path 41. The first folding guide 89 is movable in an approximately upper-and-lower direction between a projecting position projecting toward the first nip N1 across the first sheet conveyance path 41 and a retracting position separated away upward from the first sheet conveyance path 41. The tip end surface (lower end surface) of the first folding guide 89 is curved downward toward the downstream side. The tip edge of the tip end surface is formed sharply.

The second folding guide 91 is disposed on the opposite side to the second nip N2 with respect to the second sheet conveyance path 95. The second folding guide 91 is movable in an oblique direction between a projecting position projecting toward the second nip N2 across the second sheet conveyance path 95 and a retracting position separated away from the second sheet conveyance path 95 to the opposite side (right side) to the second nip N2. The tip end surface (left end surface) of the second folding guide 91 is curved along the direction from the first nip N1 toward the second nip N2. The tip edge of the tip end surface is formed sharply.

The sheet sensor 93 is disposed on the first sheet conveyance path 41 between the first branching portion B1 and the second merging portion J2. The sheet sensor 93 detects the leading end of the sheet passing through a predetermined position on the first sheet conveyance path 41. For example, the sheet sensor 93 has a light-emitting section and a light-receiving section which form an optical path, and detects that the leading end of the sheet is passed at the predetermined position when the sheet passes between the light-emitting section and the light-receiving section to block the optical path.

The post-processing apparatus 1 further includes a first switching guide 101 and a second switching guide 103. The first switching guide 101 is turnably disposed at the second merging portion J2. The first switching guide 101 is turned to a first position (see the solid line in FIG. 2), a second position (see the two-dot chain line in FIG. 2) and a third position (see the dot line in FIG. 2). At the first position, the first switching guide 101 guides the sheet conveyed along the first sheet conveyance path 41 toward the first sheet discharge port 23. At the second position, the first switching guide 101 guides the sheet conveyed along the first sheet conveyance path 41 toward the second sheet discharge port 27 along the third sheet conveyance path 45 and guides the sheet conveyed along the merging conveyance path 97 toward the first sheet discharge port 23 along the first sheet conveyance path 41. At the third position, the first switching guide 101 guides the sheet conveyed along the merging conveyance path 97 toward the second sheet discharge port 27 along the third sheet conveyance path 45.

The second switching guide 103 is turnably disposed at the third branching portion B3. The second switching guide 103 is turned to either a first position (see the solid line in FIG. 2) for guiding the sheet conveyed along the first sheet conveyance path 41 toward the first sheet discharge port 23, or a second position (see the two-dot chain line in FIG. 2) for guiding the sheet conveyed along the first sheet conveyance path 41 and switched back after passing through the third branching portion B3 toward the escape path 47.

The operation of the post-processing apparatus 1 having the above configuration will be described. First, the folding operation of the folding device 55 will be described. When the folding operation is started, the first folding guide 89 and the second folding guide 91 are respectively moved to the retracting positions. The first switching guide 101 is turned to the second position (see the two-dot chain line in FIG. 2), and guides the sheet conveyed along the first sheet conveyance path 41 toward the second sheet discharge port 27 along the third sheet conveyance path 45. The second switching guide 103 it turned to the first position (see the solid line in FIG. 2), and guides the sheet conveyed along the first sheet conveyance path 41 toward the first sheet discharge port 23.

As described above, the sheet is conveyed from the image forming apparatus 3 to the post-processing apparatus 1. In the case of the sheet on which an image is formed by the image forming apparatus 3, the sheet is carried into the first sheet conveyance path 41 from the sheet discharge port 5 of the image forming apparatus 3 through the sheet carry-in port 21 of the post-processing apparatus 1. In the case of the sheet fed from the inserter 9, the sheet is fed from one of the upper and lower manual sheet feeding trays 11 by the corresponding sheet feeding mechanism 13, conveyed along the conveyance path 15, and carried in the upper carry-in port 25 of the post-processing apparatus 1 from the sheet discharge port 17. Thereafter, the sheet is conveyed along the sheet feeding path 43, and then along the first sheet conveyance path 41 at the first merging portion J1. The inserter 9 supplies the color printed output as a cover or an interleaving sheet during bookbinding. The conveying speed of the sheet S is set to be constant.

Figure 3A:
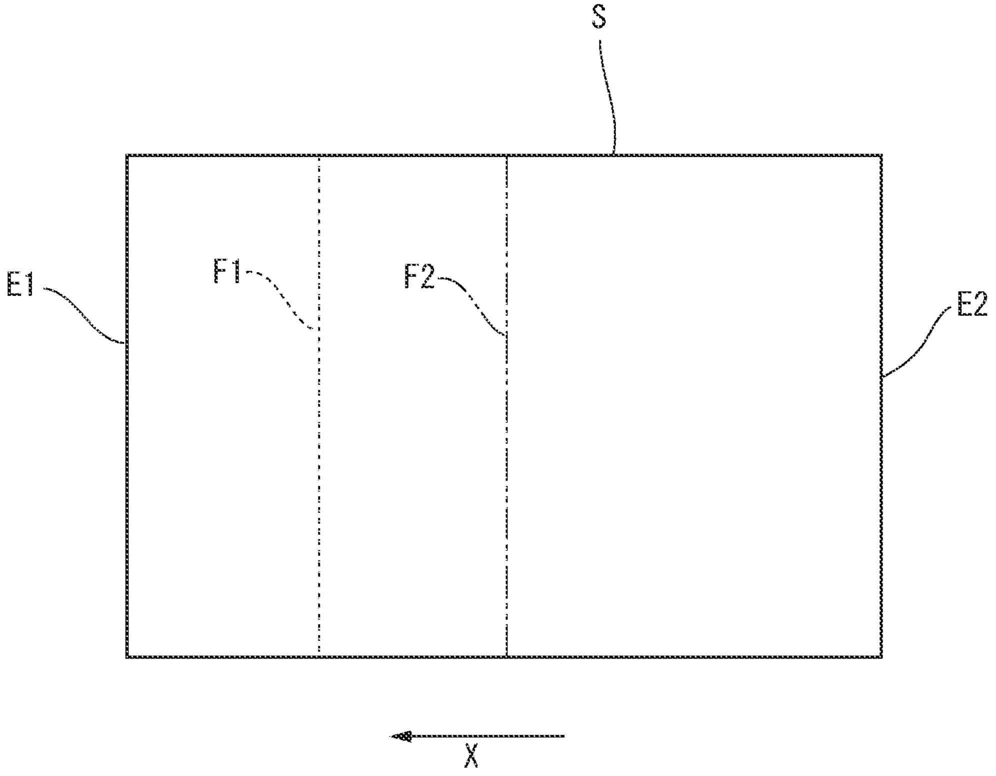
FIG. 3A is a plan view showing a sheet to be Z-fold, in the post-processing apparatus according to the embodiment of the present invention.
Figure 3B:
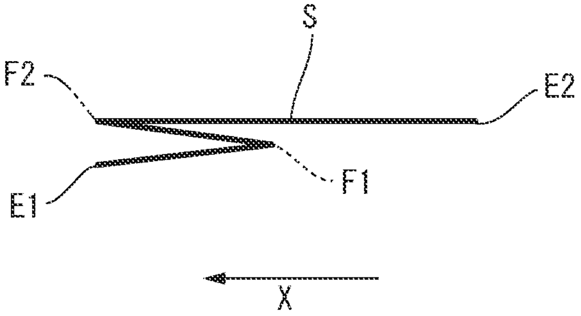
FIG. 3B is a side view showing the Z-folded sheet, in the post-processing apparatus according to the embodiment of the present invention.

First, the Z-folding will be described with reference to FIG. 3A, FIG. 3B, and FIG. 4A to FIG. 4E in addition to FIG. 2. FIG. 3A is a plan view showing the sheet to be Z-folded, and FIG. 3B is a sectional view showing the Z-folded sheet. FIG. 4A to FIG. 4E briefly show only a part of the folding device 55 at each step of the folding operation. In each figure, the length of the sheet and the positions of the folding guides 89 and 91 are not always accurately drawn.

The Z-folding is a folding method in which, as shown in FIGS. 3A and 3B, the sheet is alternately folded in opposite directions along a first fold line F1 formed at a position of ¼ of the total length (length along the conveying direction) from the leading end E1 of the sheet S and a second fold line F2 formed at a position of ½ of the total length from the leading end E1 of the sheet S, so that the sheet is folded in a Z-shape when viewed from a direction along the fold lines. Hereinafter, the total length of the sheet S indicates the length along the conveying direction. The positions of the first and second fold lines F1 and F2 are not necessarily accurate.

Figure 4A:
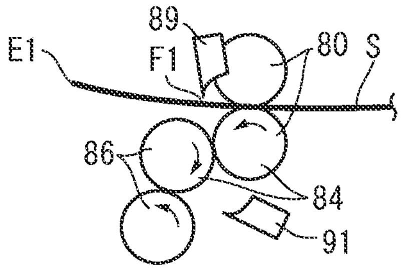
FIG. 4A is a view schematically showing the folding device at a first step in the Z-folding processing, in the post-processing apparatus according to the embodiment of the present invention.

As shown in FIG. 4A, the first roller 81 is driven by the motor to be rotated in a predetermined rotation direction (counterclockwise direction), and the third and fourth rollers 85 and 87 also start to be rotated. The sheet S is conveyed along the first sheet conveyance path 41 by the conveying rollers pair 80, and guided from the first sheet conveyance path 41 to the third sheet conveyance path 45 by the first switching guide 101. Then, when the sheet sensor 93 detects that the first fold line F1 of the sheet S reaches the first branching portion B1 (the leading end E1 of the sheet S is conveyed from the first branching portion B1 by ¼ of the total length of the sheet S), the first folding guide 89 is projected to the projecting position.

It should be noted that the fact that the sheet S is conveyed from the first branching portion B1 by a length of ¼ of the total length of the sheet S is obtained as follows, for example. From the total length (L (m)) of the sheet S, the conveying speed (v (m/s)) of the sheet S, and the distance (d (m)) between the predetermined position (the detection position of the sheet sensor 93) and the first branching portion B1, the conveying time ($t=(L/4-d)/v$) when the sheet is conveyed from the detection position to the position of the leading end E1 of the sheet S when the sheet is conveyed from the first branching portion B1 by ¼ of the total length is obtained. After the conveying time t is elapsed from the time when the leading end E1 of the sheet S is detected by the sheet sensor 93, the sheet S is conveyed from the first branching portion B1 by ¼ of the total length of the sheet S.

Figure 4B:
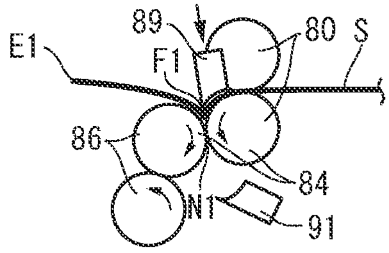
FIG. 4B is a view schematically showing the folding device at a second step in the Z-folding processing, in the post-processing apparatus according to the embodiment of the present invention.
Figure 4C:
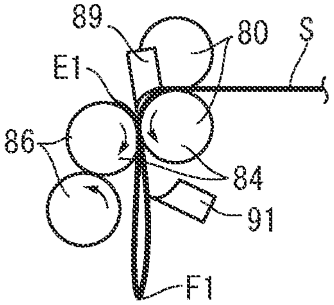
FIG. 4C is a view schematically showing the folding device at a third step in the Z-folding processing, in the post-processing apparatus according to the embodiment of the present invention.

When the first folding guide 89 is projected to the projecting position as shown in FIG. 4B, the sheet S is guided to the first nip N1 along the second sheet conveyance path 95 with the first fold line F1 forward by the conveying force of the conveying rollers pair 80. Then, the sheet is conveyed through the first nip N1 by the first folding rollers pair 84, so that the sheet is folded along the first fold line F1 as shown in FIG. 4C. The sheet S is valley-folded along the first fold line F1 with respect to the upper surface of the sheet S conveyed to the first sheet conveyance path 41.

Figure 4D:
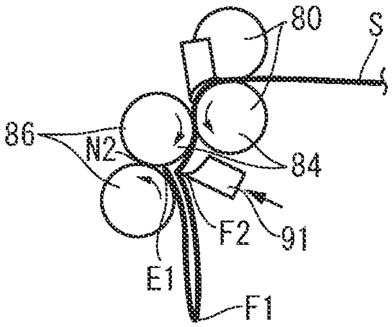
FIG. 4D is a view schematically showing the folding device at a fourth step in the Z-folding processing, in the post-processing apparatus according to the embodiment of the present invention.

Thereafter, as shown in FIG. 4D, the second folding guide 91 is projected to the projecting position at a predetermined timing. The predetermined timing is the time at which the time when the sheet S is conveyed by ¼ of the total length is elapsed from the time when the first fold line F1 of the sheet S reaches the first branching portion B1. At this time, the second fold line F2 of the sheet S reaches the first branching portion B1.

Figure 4E:
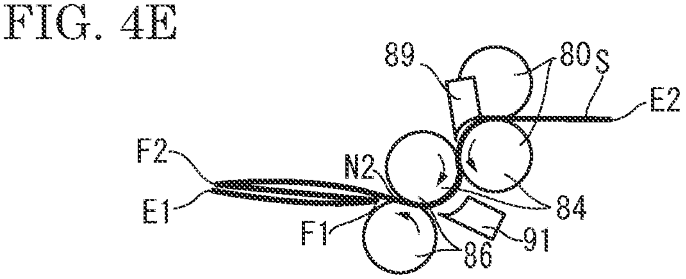
FIG. 4E is a view schematically showing the folding device at a fifth step in the Z-folding processing, in the post-processing apparatus according to the embodiment of the present invention.

When the second folding guide 91 is projected to the projecting position, the sheet S is guided to the second nip N2 along the merging conveyance path 97 with the leading end E1 and the second fold line F2 forward by the conveying force of the first folding rollers pair 84. By being conveyed through the second nip N2 by the second folding rollers pair 86, the sheet is folded along the second fold line F2 as shown in FIG. 4E. The sheet S is mountain-folded along the second fold line F2 with respect to the upper surface of the sheet S conveyed to the first sheet conveyance path 41.

Thereafter, the first switching guide 101 is turned to the second position. Thus, the sheet S conveyed along the merging conveyance path 97 by the second folding rollers pair 86 is guided along the first sheet conveyance path 41 toward the first sheet discharge port 23 by the first switching guide 101, discharged from the first sheet discharge port 23, and then stacked on the first sheet discharge tray 31. The first, third and fourth rollers 81, 85 and 87 stop the driving at appropriate timing. The first and second folding guides 89 and 91 is moved to the retracting position at appropriate timing. When the sheet S is a large size (A3 size, or the like), although the sheet is discharged from the first sheet discharge port 23 as described above, when the sheet S is a small size (A4 size, or the like), the sheet is discharged from the second sheet discharge port 27. However, the large size sheet S may be discharged from the second sheet discharge port 27.

Figure 5A:
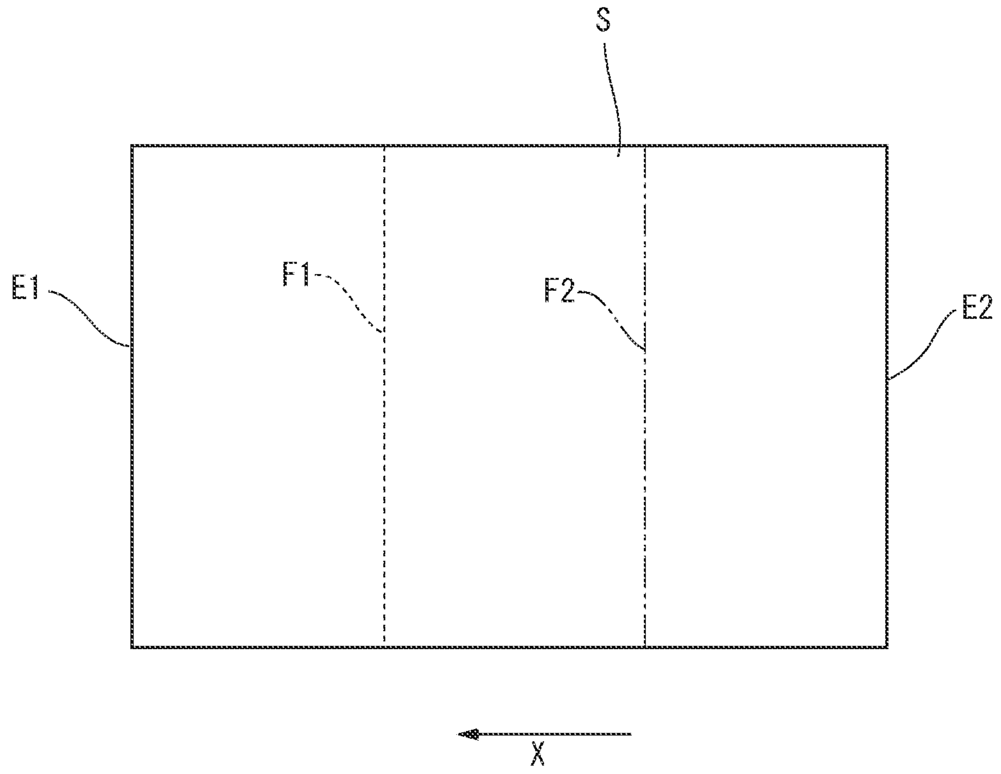
FIG. 5A is a plan view showing a sheet to be outward three-folded, in the post-processing apparatus according to the embodiment of the present invention.
Figure 5B:
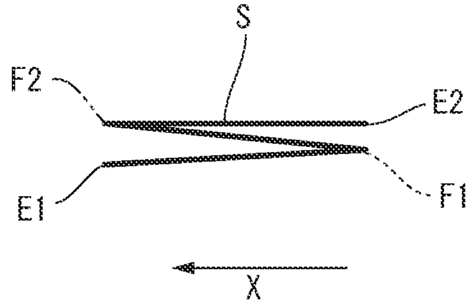
FIG. 5B is a side view showing the outward three-folded sheet, in the post-processing apparatus according to the embodiment of the present invention.

Next, the outward three-folding will be described with reference to FIG. 5A and FIG. 5B and FIG. 6A to FIG. 6E. FIG. 5A is a plan view showing the sheet to be outward three-folded, and FIG. 5B is a sectional view showing the outward three-folded sheet. FIG. 6A to FIG. 6E briefly show only a part of the folding device 55 at each step of the folding operation.

The outward three-folding is a folding method in which, as shown in FIG. 5A and FIG. 5B, the sheet is alternately folded in opposite directions along a first fold line F1 formed at a position of ⅓ of the total length from the leading end E1 of the sheet S and a second fold line F2 formed at a position of ⅔ of the total length from the leading end E1 of the sheet S, so that the sheet is folded in a Z-shape when viewed from a direction along the fold lines.

Figure 6A:
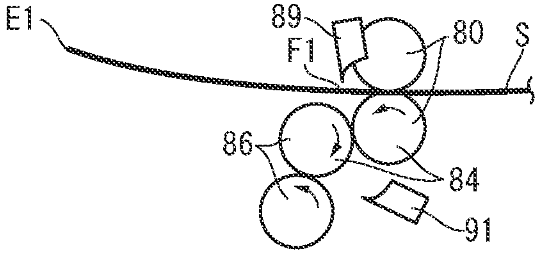
FIG. 6A is a view schematically showing the folding device at a first step in the outward three-folding processing, in the post-processing apparatus according to the embodiment of the present invention.

As shown in FIG. 6A, the first roller 81 is driven by the motor to be rotated in a predetermined rotational direction (counterclockwise direction), and the third and fourth rollers 85 and 87 also start to be rotated. The sheet S is conveyed along the first sheet conveyance path 41 by the conveying rollers pair 80, guided by the first switching guide 101, and conveyed from the first sheet conveyance path 41 to the third sheet conveyance path 45. When the sheet sensor 93 detects that the first fold line F1 of the sheet S reaches the first branching portion B1, the first folding guide 89 is projected to the projecting position. It is to be noted that the fact that the first fold line F1 of the sheet S reaches the first branching portion B1 can be obtained in the same manner as the Z-folding described above.

Figure 6B:
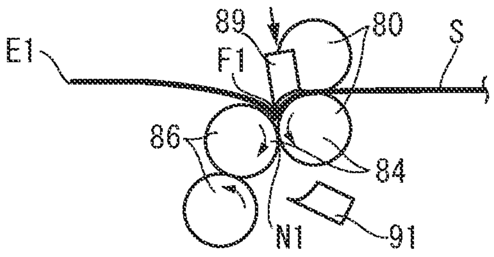
FIG. 6B is a view schematically showing the folding device at a second step in the outward three-folding processing, in the post-processing apparatus according to the embodiment of the present invention.
Figure 6C:
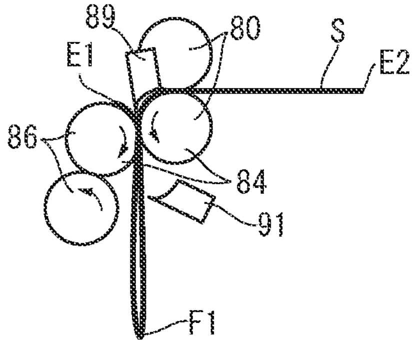
FIG. 6C is a view schematically showing the folding device at a third step in the outward three-folding processing, in the post-processing apparatus according to the embodiment of the present invention.

As shown in FIG. 6B, when the first folding guide 89 is projected to the projecting position, the sheet S is guided to the first nip N1 along the second sheet conveyance path 95 with the first fold line F1 forward by the conveying force of the conveying rollers pair 80. By being conveyed through the first nip N1 by the first folding rollers pair 84, the sheet S is folded along the first fold line F1 as shown in FIG. 6C. The sheet S is valley-folded along the first fold line F1 with respect to the upper surface of the sheet S conveyed to the first sheet conveyance path 41.

Figure 6D:
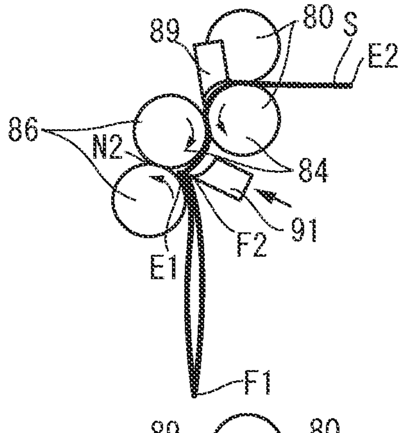
FIG. 6D is a view schematically showing the folding device at a fourth step in the outward three-folding processing, in the post-processing apparatus according to the embodiment of the present invention.

Thereafter, as shown in FIG. 6D, the second folding guide 91 is projected to the projecting position at a predetermined timing. The predetermined timing is a time when the time when the sheet S is conveyed by ⅓ of the total length is elapsed from the time when the first fold line F1 of the sheet S reaches the first branching portion B, for example. At this time, the second fold line F2 of the sheet S reaches the second branching portion B2.

Figure 6E:
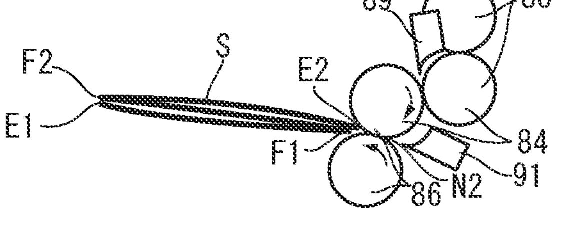
FIG. 6E is a view schematically showing the folding device at a fifth step in the outward three-folding processing, in the post-processing apparatus according to the embodiment of the present invention.

When the second folding guide 91 is projected to the projecting position, the sheet S is guided to the second nip N2 along the merging conveyance path 97 with the leading end E1 and the second fold line F2 forward by the conveying force of the first folding rollers pair 84. By being conveyed through the second nip N2 by the second folding rollers pair 86, the sheet is folded along the second fold line F2 as shown in FIG. 6E. The sheet S is mountain-folded along the second fold line F2 with respect to the upper surface of the sheet S conveyed to the first sheet conveyance path 41.

Thereafter, the first switching guide 101 is turned to the third position. As a result, the sheet conveyed along the merging conveyance path 97 by the second folding rollers pair 86 is guided along the third sheet conveyance path 45 toward the second sheet discharge port 27 by the first switching guide 101, discharged from the second sheet discharge port 27, and then stacked on the second sheet discharge tray 33.

Figure 7A:
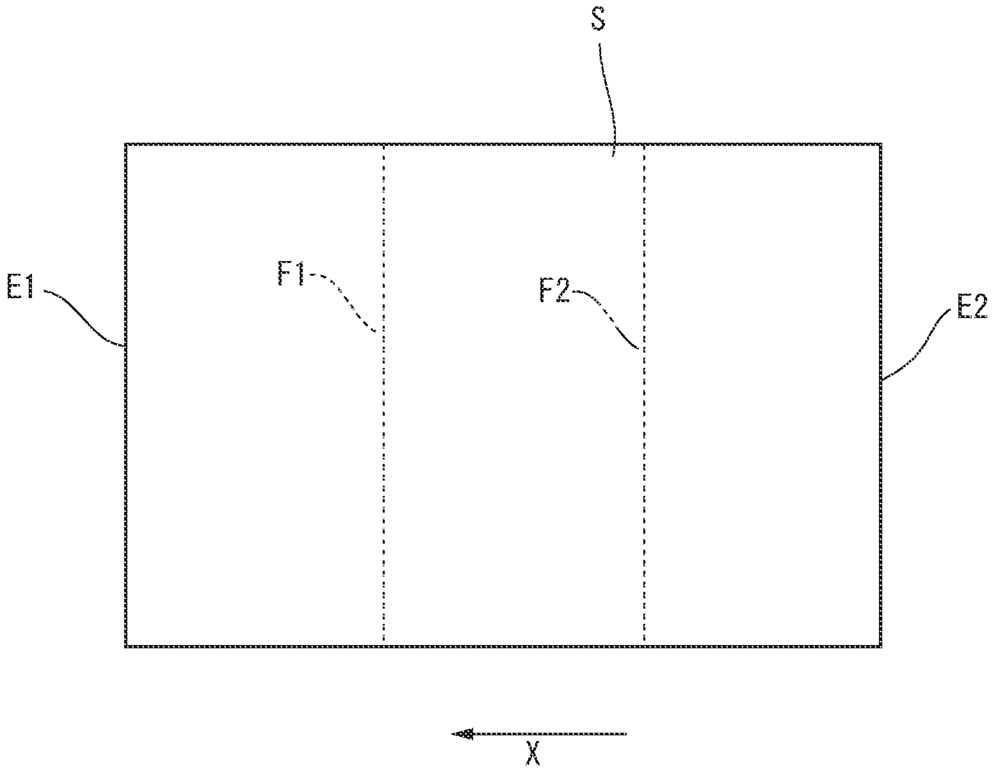
FIG. 7A is a plan view showing a sheet to be inward three-folded, in the post-processing apparatus according to the embodiment of the present invention.
Figure 7B:
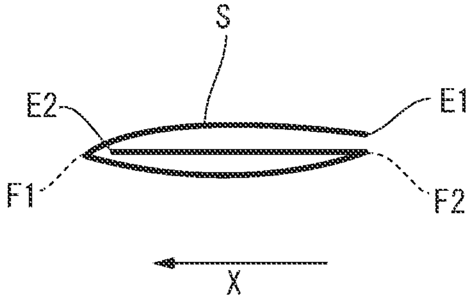
FIG. 7B is a side view showing the inward three-folded sheet, in the post-processing apparatus according to the embodiment of the present invention.

Next, the inward three-folding will be described with reference to FIG. 7A and FIG. 7B and FIG. 8A to 8C, FIG. 9A and FIG. 9B. FIG. 7A is a plan view showing the sheet to be inward three-folded, and FIG. 7B is a sectional view showing the inward three-folded sheet. FIG. 8A to FIG. 8C, FIG. 9A and FIG. 9B briefly show only a part of the folding device 55 at each step of the folding operation.

The inward three-folding is a folding method in which, as shown in FIG. 7A and FIG. 7B, the sheet S is folded in the same direction along a first fold line F1 formed at a position of ⅓ of the total length from the leading end E1 and a second fold line F2 formed at a position of ⅔ of the total length from the leading end E1.

Figure 8A:
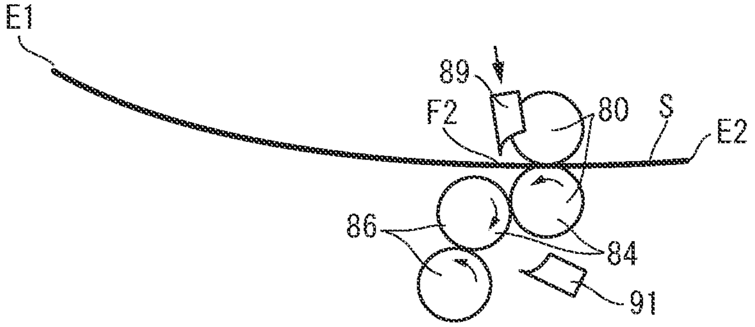
FIG. 8A is a view schematically showing the folding device at a first step in the inward three-folding processing, in the post-processing apparatus according to the embodiment of the present invention.

As shown in FIG. 8A, the first roller 81 is driven by the motor to be rotated in a predetermined rotation direction (counterclockwise direction), and the third and fourth rollers 85 and 87 also start to be rotated. The sheet S is conveyed along the first sheet conveyance path 41 by the conveying rollers pair 80, guided by the first switching guide 101 to be conveyed from the first sheet conveyance path 41 to the third sheet conveyance path 45. When the sheet sensor 93 detects that the second fold line F2 of the sheet S reaches the first branching portion B1, the first folding guide 89 is projected to the projecting position. It should be noted that the fact that the second fold line F2 of the sheet S reaches the first branching portion B1 can be obtained in the same manner as the Z-folding described above.

Figure 8B:
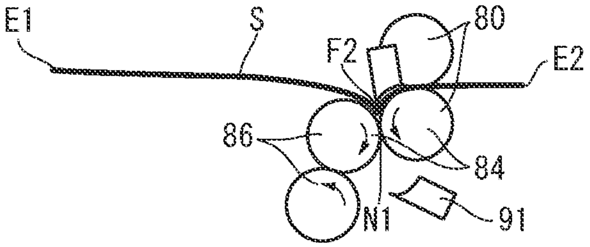
FIG. 8B is a view schematically showing the folding device at a second step in the inward three-folding processing, in the post-processing apparatus according to the embodiment of the present invention.
Figure 8C:
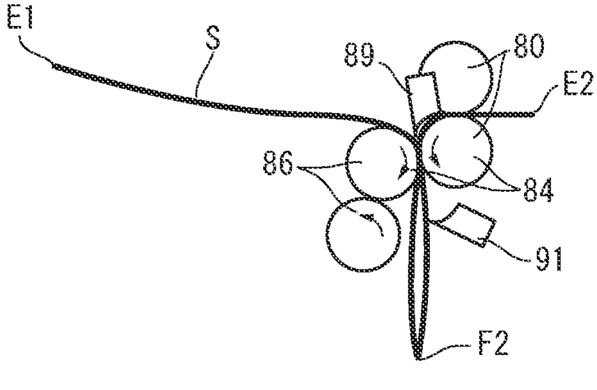
FIG. 8C is a view schematically showing the folding device at a third step in the inward three-folding processing, in the post-processing apparatus according to the embodiment of the present invention.

As shown in FIG. 8B, when the first folding guide 89 is projected to the projecting position, the sheet S is guided to the first nip N1 along the second sheet conveyance path 95 with the second fold line F2 forward by the conveying force of the conveying rollers pair 80. Then, the sheet S is conveyed through the first nip N1 by the first folding rollers pair 84, so that the sheet S is folded along the second fold line F2 as shown in FIG. 8C. The sheet S is valley-folded along the second fold line F2 with respect to the upper surface of the sheet S conveyed to the first sheet conveyance path 41.

Figure 9A:
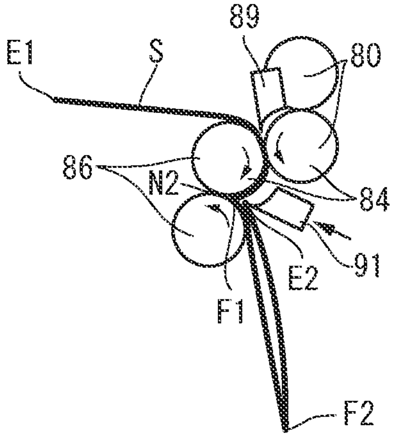
FIG. 9A is a view schematically showing the folding device at a fourth step in the inward three-folding processing, in the post-processing apparatus according to the embodiment of the present invention.

Thereafter, as shown in FIG. 9A, the second folding guide 91 is projected to the projecting position at a predetermined timing. The predetermined timing is the time when the time when the sheet S is conveyed by ⅓ of the total length is elapsed from the time when the second fold line F2 of the sheet S reaches the first branching portion B1. At this time, the first fold line F1 of the sheet S reaches the second branching portion B2.

Figure 9B:
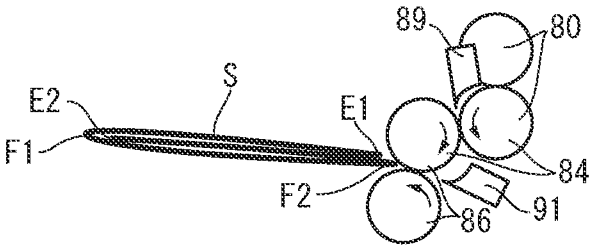
FIG. 9B is a view schematically showing the folding device at a fifth step in the inward three-folding processing, in the post-processing apparatus according to the embodiment of the present invention.

When the second folding guide 91 is projected to the projecting position, the sheet S is guided to the second nip N2 along the merging conveyance path 97 with the trailing end E2 and the first fold line F1 forward by the conveying force of the first folding rollers pair 84. Then, by being conveyed through the second nip N2 by the second folding rollers pair 86, the sheet is folded along the first fold line F1 as shown in FIG. 9B. Here, unlike the outward three-folding, the portion between the second fold line F2 and the trailing end E2 of the sheet S is overlapped inward. The sheet S is valley-folded along the first fold line F1 with respect to the upper surface of the sheet S conveyed to the first sheet conveyance path 41.

Thereafter, the first switching guide 101 is turned to the third position. As a result, the sheet conveyed along the merging conveyance path 97 by the second folding rollers pair 86 is guided along the third sheet conveyance path 45 toward the second sheet discharge port 27 by the first switching guide 101, discharged from the second sheet discharge port 27, and then stacked on the second sheet discharge tray 33.

Figure 10A:
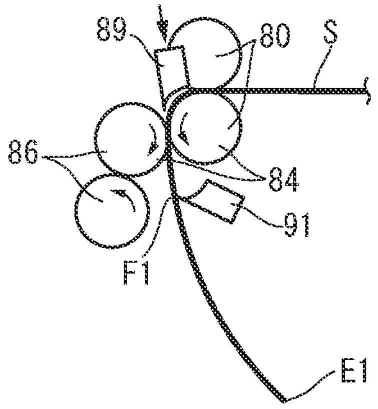
FIG. 10A is a view schematically showing the folding device at a first step in the two-folding processing, in the post-processing apparatus according to the embodiment of the present invention.
Figure 10B:
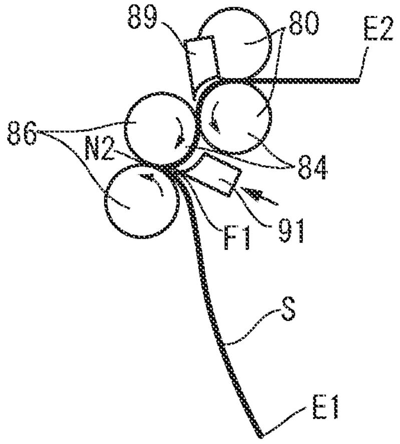
FIG. 10B is a view schematically showing the folding device at a second step in the two-folding processing, in the post-processing apparatus according to the embodiment of the present invention.
Figure 10C:
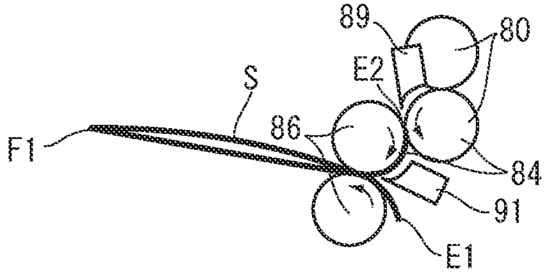
FIG. 10C is a view schematically showing the folding device at a third step in the two-folding processing, in the post-processing apparatus according to the embodiment of the present invention.

Next, the two-folding will be described with reference to FIG. 10A to FIG. 10C. FIG. 10A to FIG. 10C briefly show only a part of the folding device 55 at each step of the folding operation. The two-folding is a folding method in which the sheet S is folded along a first fold line F1 formed at ½ of the total length from the leading end E1.

As shown in FIG. 10A, the first roller 81 is driven by the motor to be rotated in a predetermined rotation direction (counterclockwise direction), and the third and fourth rollers 85 and 87 also start to be rotated. The sheet S is conveyed along the first sheet conveyance path 41 by the conveying rollers pair 80. Before the leading end of the sheet S reaches the first branching portion B1, the first folding guide 89 is projected to the projecting position. Thus, the leading end E1 of the sheet S is guided to the first nip N1 along the second sheet conveyance path 95 by the tip end surface of the first folding guide 89. Thereafter, the sheet S is conveyed along the second sheet conveyance path 95 through the first nip N1 by the first folding rollers pair 84.

When it is detected that the first fold line F1 of the sheet S reaches the second branching portion B2, the second folding guide 91 is projected to the projecting position as shown in FIG. 10B. When the sheet S is two-folded, since the sheet S is not detected by the sheet sensor 93, the fact that the first fold line F1 of the sheet S reaches the second folding position P2 is detected based on the time when the sheet S is detected by the sheet sensor arranged at another position (for example, inside the sheet carry-in port 21) or the like.

When the second folding guide 91 is projected to the projecting position, the sheet S is guided to the second nip N2 along the merging conveyance path 97 with the first fold line F1 forward by the conveying force of the first folding rollers pair 84. Then, by being conveyed through the second nip N2 by the second folding rollers pair 86, the sheet S is folded along the first fold line F1. The sheet S is mountain-folded along the first fold line F1 with respect to the upper surface of the sheet S conveyed to the first sheet conveyance path 41.

Thereafter, in the same manner as the outward three-folding, the sheet S is conveyed along the merging conveyance path 97 by the second folding rollers pair 86, and is guided toward the second sheet discharge port 27 along the third sheet conveyance path 45 by the first switching guide 101. Thereafter, the sheet S is discharged from the second sheet discharge port 27 and then stacked on the second sheet discharge tray 33.

The explanation of the four-folding is omitted.

Next, the punching processing, the stapling processing and the bookbinding processing will be briefly described with reference to FIG. 1 and FIG. 2. The first folding guide 89 and the second folding guide 91 are moved to the retracting position.

In the case of the punching processing, a punching hole is formed by the punching device 53 at a predetermined position of the sheet conveyed to the first sheet conveyance path 41. The sheet formed with the punched hole is conveyed to the first sheet discharge port 23 or the second sheet discharge port 27 along the first sheet conveyance path 41 or the third sheet conveyance path 45.

In the case of the stapling processing, the sheet S is conveyed along the first sheet conveyance path 41 by the carry-in rollers pair 51 and the conveying rollers pair 80. Thereafter, the sheet S is switched back by the discharge rollers pair 59, and is stacked on the first processing tray 65 of the stapling unit 57. After a predetermined number of the sheets are stacked on the first processing tray 65 to form a sheet bundle, the sheet bundle is stapled by the stapler 67. The stapled sheet bundle is conveyed along the first processing tray 65, discharged from the first sheet discharge port 23, and then stacked on the first sheet discharge tray 31. When the first sheet of the next sheet bundle is conveyed during the processing of the last sheet bundle by the stapling unit, the first sheet is temporarily escaped to the scape path 47 and overlapped with the sheet to be conveyed next, and then conveyed to the first processing tray 65. As a result, it is possible to prevent the productivity of the processing operation from decreasing.

In the bookbinding processing, the first folding guide 89 is projected to the projecting position before the leading end of the sheet conveyed along the first sheet conveyance path 41 by the conveying rollers pair 80 reaches the first branching portion B1. Then, the sheet is guided from the first sheet conveyance path 41 to the second sheet conveyance path 95 along the first folding guide 89. The sheet is conveyed along the second sheet conveyance path 95 by the first folding rollers pair 84, and then conveyed to the carry-in path 71.

The sheet carried in from the carry-in path 71 is stacked on the second processing tray 73. After a predetermined number of the sheets are stacked on the second processing tray 73 to form a sheet bundle, the sheet bundle is saddle-stitched by the saddle stitching device 75, and further, is center-folded by the center-folding device 77. The center-folded sheet bundle is discharged from the third sheet discharge port 29 through the discharge part 78, and then stacked on the third sheet discharge tray 35.

As described above, in the post-processing apparatus 1 of the present invention, by providing the first folding guide 89, it becomes possible to smoothly perform the conveying of the sheet to the predetermined post-processing part (the stapling unit 57 and the bookbinding unit 61) and the folding processing to the sheet by the folding device 55. In particular, when the bookbinding unit 61 performs the bookbinding processing, the sheet is conveyed along the second sheet conveyance path 95, whereby it becomes possible to shorten the conveying distance of the sheet and the conveying time of the sheet as compared with the case where the sheet is conveyed through the escape path 47. Further, the sheet can be stacked on the second processing tray 73 of the bookbinding unit 61 with the surface on which the image is formed facing upward.

Further, the folding device 55 is configured such that the first, third and fourth rollers 81, 85 and 87 are rotated in only one direction to fold the sheet. In the prior art, since the driving roller is inverted, it is necessary to take time to rotate the driving roller in the other direction after stopping the rotation of the roller in one direction. However, in the present embodiment, it is not necessary to invert the rollers 81, 85 and 87, so that the productivity of the folding processing is improved. Also, the sheet can be Z-folded, outward three-folded, inward three-folded folded and four-folded along two fold lines, and two-folded along one fold line. Thus, the sheet can be folded in various ways.

Further, the sheet can be discharged from either the first sheet discharge port 23 or the second sheet discharge port 27 according to the folding method of the sheet. For example, in the case of the Z-folding, the large size sheet is discharged from either the first sheet discharge port 23 or the second sheet discharge port 27, and the small size sheet is discharged from the second sheet discharge port 27. In the case of the outward three-folding, inward three-folding and two-folding, the sheet is discharged from the second sheet discharge port 27. Thereby, the folded sheet can be distinguished according to the folding method and then discharged.

Further, since the sheet can be fed from the inserter 9, the various sheet bundles can be formed.

In the present embodiment, the first, third and fourth rollers 81, 85 and 87 are connected by the gear train and rotated at the same time, but it is not necessary to rotate them at the same time, and they may be rotated individually.

Further, in the present embodiment, the timing for projecting the first and second folding guides 89 and 91 to the projecting position is determined based on the elapsed time from the time when the leading end of the sheet is detected by the sheet sensor 93 (or another sheet sensor), but the present invention is not limited to this. For example, another sheet sensor may be disposed in the first sheet conveyance path 41 or the like to detect the position of the sheet on each path.

Although the present invention has been described about certain embodiments, the present invention is not limited to the above embodiments. Those skilled in the art will be able to modify the above embodiments without departing from the scope and spirit of the invention.

The invention claimed is:

1. A post-processing apparatus comprising:

a first sheet conveyance path along which a sheet is conveyed in a first direction from a sheet carry-in port to a first sheet discharge port;

a first processing part which performs a folding processing in which the sheet conveyed along the first conveyance path is fold along a fold line parallel with a width direction perpendicular to the first direction;

a second sheet conveyance path along which the sheet is conveyed from the first processing part along a second direction crossing the first direction;

a merging conveyance path along which the sheet is conveyed from the first processing part in a third direction crossing the second direction and which merges with the first sheet conveyance path;

a second processing part which is provided on a downstream side of the first processing part in the first direction and performs post-processing on the sheet conveyed along the first sheet conveyance path; and a third processing part which is provided on a downstream side of the first processing part in the second direction and performs post-processing on the sheet which is passed through the first processing part and is conveyed along the second sheet conveyance path, wherein the first processing part includes:

a conveying rollers pair including a first roller and a second roller which form a conveying nip and conveying the sheet in the first direction;

a first folding rollers pair including the first roller and a third roller which form a first nip, conveying the sheet along the second direction and performing a folding processing in which the sheet is fold along a first fold line;

a second folding rollers pair including the third roller and a fourth roller which form a second nip, conveying the sheet along the third direction and performing a folding processing in which the sheet is fold along a second fold line different from the first fold line;

a first folding guide configured to be movable between a projecting position close to the first nip and a retracting position away from the first nip; and a second folding guide configured to be movable between a projecting position close to the second nip and a retracting position away from the second nip, wherein when the sheet is conveyed along the first direction, the first folding guide is disposed at the retracting position, when the sheet is conveyed from the first conveyance path to the second conveyance path, the first folding guide is moved from the retracting position to the projecting position to guide a leading end of the sheet to the first nip, and when the folding processing in which the sheet is fold along the first fold line by the first folding rollers pair is performed, after the leading end of the sheet is passed through the first folding guide, the first folding guide is moved from the retracting position to the projecting position so as to come into contact with the first fold line of the sheet and to guide the sheet to the first nip with the first fold line forward, wherein the post-processing apparatus further comprises an escape path configured to escape a first sheet of a next sheet bundle and overlap the first sheet with a second sheet of the next sheet bundle during the processing of the preceding sheet bundle in the second processing part, and the escape path communicates with the second sheet conveyance path.

2. The post-processing apparatus according to claim 1 further comprising:

a second sheet discharge port formed at a position different from the first sheet discharge port;

a third sheet conveyance path branching from the first sheet conveyance path at a merging portion of the first sheet conveyance path and the merging conveyance path and extending toward the second sheet discharge port; and a first switching guide which is turnably disposed at the merging portion and configured to selectively guide the sheet conveyed along the merging conveyance path to the first sheet discharge port or the second sheet discharge port.

3. The post-processing apparatus according to claim 2, wherein the first processing part can perform a plurality of folding processing including Z-folding, outward three-folding, inward three-folding and two-folding for a sheet, and the first switching guide guides a Z-folded large size sheet to either the first sheet discharge port or the second sheet discharge port, guides a Z-folded small size sheet to the second discharge port, and guides an outward three-folded sheet, an inward three-folded sheet and a two-folded sheet to the second discharge port.

4. The post-processing apparatus according to claim 1, wherein the second processing part is a stapling unit including a first processing tray on which the sheet is stacked and a stapler which staples a bundle of the sheets stacked on the first processing tray.

5. The post-processing apparatus according to claim 1, wherein the third processing part is a bookbinding unit including a second processing tray on which the sheet is stacked; a saddle stitching device which saddle-stitches a bundle of the sheets stacked on the second processing tray; and a center-folding device which folds the saddle-stitched bundle by the saddle stitching device.

6. The post-processing apparatus according to claim 1, wherein the first roller, the third roller and the fourth roller rotate only in one direction when conveying the sheet and when performing the folding processing.

7. The post-processing apparatus according to claim 1 further comprising:

a sheet sensor which detects the sheet conveyed along the first conveyance path on the downstream side of the first folding guide in the first direction, wherein the first folding guide is moved from the retracting position to the projecting position based on a detection result of the sheet sensor.

* * * * *